UNITED STATES PATENT OFFICE.

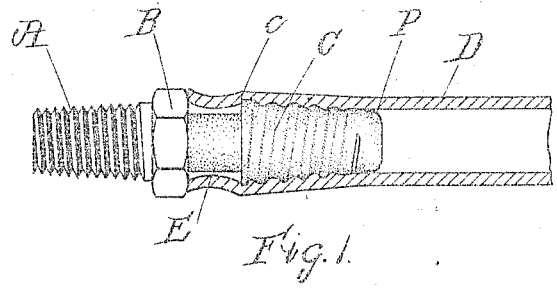
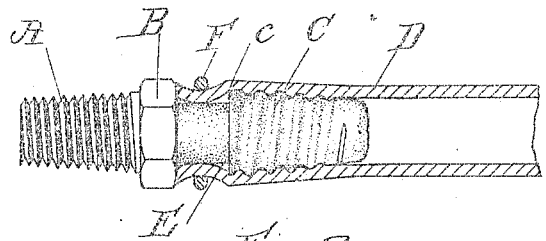
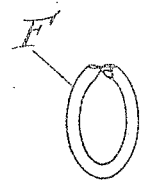
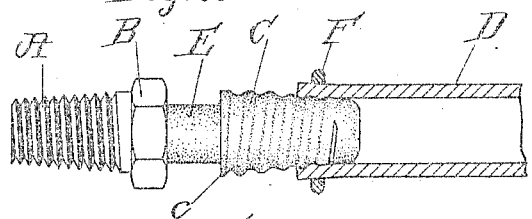
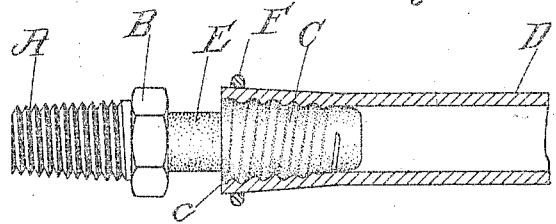
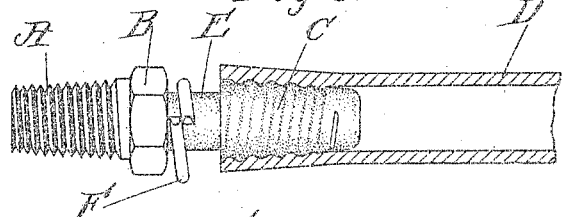

LYMAN S. STACEY, OF QUINCY, MASSACHUSETTS, ASSIGNOR TO WILLIAM E. McKEE, OF BOSTON, MASSACHUSETTS.

HOSE-COUPLING.

1,067,202.  Specification of Letters Patent.  Patented July 8, 1913.

Application filed April 29, 1909. Serial No. 492,880.

*To all whom it may concern:*

Be it known that I, LYMAN S. STACEY, citizen of the United States, residing at Quincy, in the county of Norfolk and State of Massachusetts, have invented a certain new and useful Improvement in Hose-Couplings, of which the following is a specification, reference being had therein to the accompanying drawings.

My invention relates to hose couplings and particularly to the so-called "leading" nipple employed to connect a pneumatic tool or the like to the flexible hose which conveys the compressed air to the tool.

In the use of pneumatic tools it is frequently necessary to disconnect the hose from the tool, and this operation has to be performed many times a day. This results in the rapid deterioration of the end of the hose which soon gets into such a condition that it will not remain connected with the nipple. It is then necessary to cut off the end of the hose, thus resulting in waste and loss of time.

My present invention provides means for attaching the hose to the nipple in such manner that the hose will not become disconnected from the nipple even though the end of the hose has become very much worn. The tool may be quickly uncoupled from the hose, leaving the hose connection in place in the hose, or the hose may be quickly attached and detached from the connection. The hose connection is no more expensive to construct than those heretofore in use.

The invention will be fully understood from the following description taken in connection with the accompanying drawings, and the novel features will be pointed out and clearly defined in the claim at the close of the specification.

In the drawings:—Figure 1 is a longitudinal view of a hose connection embodying my invention, the end of the hose being in section. Fig. 2 is a similar view of the same hose connection employed with a spring band. Fig. 3 is a view in perspective of said spring band. Fig. 4 illustrates the process of inserting the nipple in the end of the hose when the spring band is used. Fig. 5 shows the first step in removing the nipple from the hose when the spring band is employed. Fig. 6 shows the second step of the process of removing the spring band from the nipple.

Referring to the drawings,—at A is shown the tapering screw-threaded end of the hose connection intended for insertion into the correspondingly screw-threaded portion of the pneumatic tool. This portion is preferably provided with right-hand screw-threads. Next to the portion A is the square or hexagonal portion B adapted for engagement with a wrench. At C there is shown a second tapering screw-threaded nipple for insertion in the hose D. This portion is provided with a smooth rounded end portion P for insertion in the end of the hose, and round screw-threads which run in the opposite direction to those on the other nipple A. In this case the threads on the nipple C are left-hand, since those on nipple A are right-hand. The said nipple C and the hexagonal portion B are separated from each other by a constricted portion or neck E. Between the said nipple C and the constricted portion E is preferably a sharp shoulder.

The hose connection may be attached to the end of the hose by inserting the end of the nipple C which is slightly smaller than the bore of the hose in the end of the hose and then screwing the nipple in, if necessary with the aid of a wrench, until the end of the hose lies against the hexagonal portion B as will be seen in Fig. 1 which prevents the further movement of the hose. The hose tends to contract at the neck or constricted portion E so that the shoulder *c* bites into the hose and holds the hose securely in place. This construction is entirely satisfactory for use with new hose or with hose which is not badly worn, or with hose which does not require to be frequently removed, but I prefer to employ a spring band such for instance as is shown at F in Fig. 3 in cases where the hose has become badly worn or softened. This spring band is made from properly tempered steel or the like and is made capable of placing considerable pressure upon the hose. It has an inside diameter of about that of the nipple C at the shoulder *c*, and its ends overlap slightly as shown.

When in place, the parts assume the position shown in Fig. 2, the spring band F compressing the hose into the neck or constricted portion E. To put the hose connection in place in the end of the hose when the spring band is employed, the spring band is first slipped onto the end of the hose until it occupies a position a slight distance back of the end of the hose. The nipple D is then screwed into the hose, causing the spring band F to expand until it has passed over the shoulder $c$ after which it is free to contract and thus holds the hose firmly into the neck or constricted portion E.

To disconnect the hose connection and the hose, the parts are unscrewed for a short distance until in about the position shown in Fig. 5. The spring band F is then slipped off the end of the hose and into the groove formed by the constricted portion E (see Fig. 6). The hose being then free from the spring band may be entirely unscrewed.

The hose connection embodying my invention especially when used with a spring band holds the hose very securely, but at the same time permits the hose to be detached quickly if required. It will hold worn or frayed hose or hose which has lost its elasticity as well as new hose.

It will be observed that the threads A are right-hand, while the threads C are left-hand, and that the threads A are intended for engagement with the tool while the threads C engage the hose. This construction is of importance for the following reason: When the pneumatic tool is to be removed, it is turned about on the nipple by hand, and the effect of this movement is only to screw the other end of the connection into the hose more tightly, while the connection unscrews from the tool. If the threads on the hose end of the connection were the same as those on the other end, the tendency would be for the connection to draw out of the hose and do injury to the hose when the tool was being unscrewed. With the device as shown herein, there is no such tendency. The nipple forms a perfectly tight joint with the hose and no leakage occurs.

It will be noticed that the spring band F is chamfered or beveled so that it will not tear the outer surface of the hose as it contracts in being put in place, and also so that it cannot catch on the clothes of the operator, if, for instance as frequently occurs, the tool and attached hose is thrown over the shoulder of the workman.

What I claim is:

The improved hose connection comprising the combination of a connecting member having a screw-threaded nipple for engagement with the proximate part, a second screw-threaded nipple separated from said first mentioned nipple by a constricted portion forming a groove and a spring band for engagement with the exterior of the hose at a point opposite the said constricted portion, said spring band being chamfered on the edge in contact with the exterior of the hose.

In testimony whereof I affix my signature, in presence of two witnesses.

LYMAN S. STACEY.

Witnesses:
GEORGE P. DIKE,
ALICE H. MORRISON.